United States Patent

Ueno et al.

(10) Patent No.: US 9,489,946 B2
(45) Date of Patent: Nov. 8, 2016

(54) TRANSCRIPTION SUPPORT SYSTEM AND TRANSCRIPTION SUPPORT METHOD

(75) Inventors: Kouji Ueno, Kanagawa (JP); Nobuhiro Shimogori, Kanagawa (JP); Tomoo Ikeda, Tokyo (JP); Osamu Nisiyama, Kanagawa (JP); Hirokazu Suzuki, Tokyo (JP); Manabu Nagao, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 320 days.

(21) Appl. No.: 13/420,828

(22) Filed: Mar. 15, 2012

(65) Prior Publication Data

US 2013/0030806 A1    Jan. 31, 2013

(30) Foreign Application Priority Data

Jul. 26, 2011   (JP) .................................. 2011-163247

(51) Int. Cl.
*G10L 15/26*   (2006.01)
*G06Q 10/10*   (2012.01)
*G10L 15/22*   (2006.01)

(52) U.S. Cl.
CPC ............... *G10L 15/26* (2013.01); *G06Q 10/10* (2013.01); *G10L 2015/221* (2013.01); *G10L 2015/225* (2013.01)

(58) Field of Classification Search
CPC ..... G10L 15/26; G10L 15/265; G10L 15/54; G10L 15/065; G06F 17/30746
USPC .................. 704/211, 231, 235, 260, 270, 276
See application file for complete search history.

(56) References Cited

U.S. PATENT DOCUMENTS

| 4,207,440 A | * | 6/1980 | Schiffman | .................. 369/47.42 |
| 6,260,011 B1 | * | 7/2001 | Heckerman et al. | ......... 704/235 |
| 6,282,510 B1 | * | 8/2001 | Bennett et al. | ............... 704/235 |
| 6,332,147 B1 | * | 12/2001 | Moran et al. | ................. 715/203 |
| 6,338,038 B1 | * | 1/2002 | Hanson | ......................... 704/500 |

(Continued)

FOREIGN PATENT DOCUMENTS

| JP | 2005-165066 | 6/2005 |
| JP | 2005-228178 | 8/2005 |

(Continued)

OTHER PUBLICATIONS

Japanese Office Action for Japanese Patent Application No. 2011-163247 mailed on Apr. 8, 2014.

*Primary Examiner* — Matthew Baker
(74) *Attorney, Agent, or Firm* — Amin, Turocy & Watson LLP

(57) ABSTRACT

In an embodiment, a transcription support system includes: a first storage, a playback unit, a second storage, a text generating unit, an estimating unit, and a setting unit. The first storage stores the voice data therein; a playback unit plays back the voice data; and a second storage stores voice indices, each of which associates a character string obtained from a voice recognition process with voice positional information, for which the voice positional information is indicative of a temporal position in the voice data and corresponds to the character string. The text creating unit creates text; the estimating unit estimates already-transcribed voice positional information based on the voice indices; and the setting unit sets a playback starting position that indicates a position at which playback is started in the voice data based on the already-transcribed voice positional information.

5 Claims, 4 Drawing Sheets

(56) References Cited

U.S. PATENT DOCUMENTS

| | | | |
|---|---|---|---|
| 6,360,237 B1* | 3/2002 | Schulz et al. | 715/255 |
| 6,442,518 B1* | 8/2002 | Van Thong et al. | 704/235 |
| 6,490,553 B2* | 12/2002 | Van Thong et al. | 704/211 |
| 6,535,849 B1* | 3/2003 | Pakhomov et al. | 704/235 |
| 6,735,565 B2* | 5/2004 | Gschwendtner | 704/254 |
| 6,952,673 B2* | 10/2005 | Amir et al. | 704/235 |
| 7,010,489 B1* | 3/2006 | Lewis et al. | 704/260 |
| 7,412,378 B2* | 8/2008 | Lewis et al. | 704/211 |
| 7,805,298 B2* | 9/2010 | Bennett et al. | 704/231 |
| 8,131,545 B1* | 3/2012 | Moreno et al. | 704/235 |
| 8,332,212 B2* | 12/2012 | Wittenstein et al. | 704/211 |
| 8,676,590 B1* | 3/2014 | Sorensen | G06F 3/167 704/270 |
| 2002/0002459 A1* | 1/2002 | Lewis | G06F 17/273 704/260 |
| 2002/0010916 A1* | 1/2002 | Thong et al. | 725/1 |
| 2002/0116188 A1* | 8/2002 | Amir | G10L 13/00 704/235 |
| 2002/0143534 A1* | 10/2002 | Hol | 704/235 |
| 2002/0163533 A1* | 11/2002 | Trovato et al. | 345/728 |
| 2004/0111265 A1* | 6/2004 | Forbes | G10L 15/26 704/260 |
| 2004/0138894 A1* | 7/2004 | Kiecza et al. | 704/277 |
| 2005/0080633 A1* | 4/2005 | Lueck | G10L 15/22 704/278 |
| 2007/0011012 A1* | 1/2007 | Yurick | G10L 15/26 704/277 |
| 2008/0195370 A1 | 8/2008 | Neubacher et al. | |
| 2009/0319265 A1* | 12/2009 | Wittenstein et al. | 704/234 |
| 2010/0332225 A1* | 12/2010 | Arrowood et al. | 704/235 |
| 2011/0022387 A1* | 1/2011 | Hager | G06Q 10/107 704/235 |
| 2011/0087491 A1* | 4/2011 | Wittenstein | G10L 15/26 704/235 |
| 2011/0161082 A1* | 6/2011 | Braho et al. | 704/251 |
| 2012/0278071 A1* | 11/2012 | Garland et al. | 704/235 |
| 2013/0030804 A1* | 1/2013 | Zavaliagkos et al. | 704/235 |
| 2013/0030805 A1 | 1/2013 | Suzuki et al. | |
| 2014/0039871 A1* | 2/2014 | Crawford | G06F 17/211 704/2 |

FOREIGN PATENT DOCUMENTS

| | | |
|---|---|---|
| JP | 2010-517178 | 5/2010 |
| WO | 2008092020 | 7/2008 |

\* cited by examiner

FIG.2

| SEGMENTATION UNIT (CHARACTER STRING) | | VOICE POSITIONAL INFORMATION (ms) |
| --- | --- | --- |
| READING | MORPHEME | |
| SAKI | SAKI | 200-400 |
| HODO | HODO | 400-600 |
| NO | NO | 600-700 |
| NAIYOU | NAIYOU | 700-1100 |
| KYOU | KYOU | 1100-1400 |
| GIDAI | GIDAI | 1400-1700 |
| NI | NI | 1700-1800 |
| GOZAI | GOZAI | 1800-2100 |
| MASI | MASI | 2100-2300 |
| TA | TA | 2300-2400 |
| KEN | KEN | 2400-2600 |
| DESU | DESU | 2600-2800 |
| GA | GA | 2800-2900 |

| THRESHOLD A | 10000 (ms) |
| --- | --- |
| THRESHOLD B | 5000 (ms) |
| THRESHOLD C | 200 (ms) |

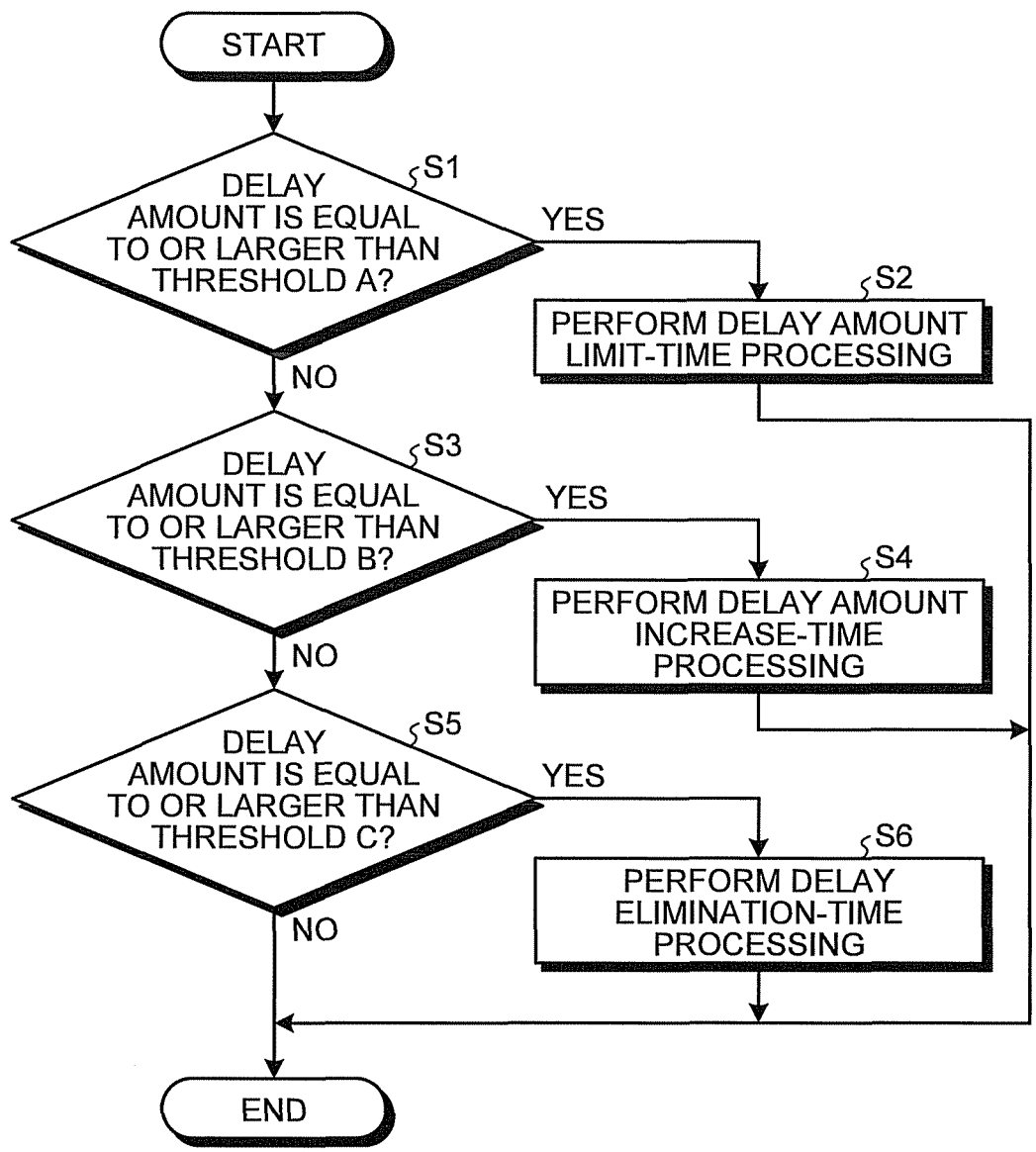

TRANSCRIPTION SUPPORT SYSTEM AND TRANSCRIPTION SUPPORT METHOD

CROSS-REFERENCE TO RELATED APPLICATIONS

This application is based upon and claims the benefit of priority from Japanese Patent Application No. 2011-163247, filed on Jul. 26, 2011; the entire contents of which are incorporated herein by reference.

FIELD

Embodiments described herein relate generally to a transcription support system and a transcription support method.

BACKGROUND

Conventionally, various techniques are well known in order to improve efficiency of the transcription work. For example, there is a well known technique that each of plural character strings constituting voice text data, which is obtained by performing a voice recognition process on the voice data, and a position of each of the character strings in the voice data (playback position) are displayed on a screen so as to be associated with each other. In the technique, when a character string on the screen is selected, because the voice data is played back from the playback position corresponding to the selected character string, a user (transcription worker) selects the character string, and the user corrects the character string while listening to the voice data.

In the technology, it is necessary that each of the plural character strings constituting the voice text data and the playback position of the voice data are displayed on the screen while correlated with each other, which results in a problem of a complicated configuration of a display control. Accordingly, from the viewpoint of simplifying the configuration of a transcription method, transcribing an audio file without any restriction while listening to the voice data is preferable to correcting the voice recognition result.

In this case, the user is forced to repeatedly temporarily stop and rewind while the transcribing. When the user resumes transcribing after the temporary stop, it is desirable that the playback is resumed from the exact position at which the transcription is completed.

Therefore, it is conceivable that a position, rewound by a predetermined amount from the position of the voice data in the temporary stop, is set to a playback starting position indicative of a position the playback starts from.

However, because a difference between the position of the voice data in the temporary stop and the position at which the transcription is completed in the voice data may not always be constant, it is difficult that the playback of the voice data is resumed from a position at which the transcription is completed. Therefore, the user frequently adjusts the position while repeating the rewind and fast-forward operation for the voice data, which results in a problem of reduced work efficiency for the user.

BRIEF DESCRIPTION OF THE DRAWINGS

FIG. 2 is a view illustrating an example of voice index;

FIG. 5 is a flowchart illustrating an example of playback control processing.

DETAILED DESCRIPTION

In an embodiment, a transcription support system includes: a first storage, a playback unit, a second storage, a text generating unit, an estimating unit, and a setting unit. The first storage stores voice data therein; a playback unit plays back the voice data; and a second storage stores voice indices, each of which associates a character string obtained from a voice recognition process with voice positional information, for which the voice positional information is indicative of a temporal position in the voice data and corresponds to the character string. The text creating unit creates text; the estimating unit estimates already-transcribed voice positional information based on the voice indices; and the setting unit sets a playback starting position that indicates a position at which playback is started in the voice data based on the already-transcribed voice positional information.

Hereinafter, transcription support systems according to embodiments of the invention will be described in detail with reference to the accompanying drawings. In the following embodiments, a PC (Personal Computer) having a function of playing back the voice data and a text generation function of generating the text according to an operation of a user is cited as an example of the transcription support system. However, the invention is not limited to the embodiments. In the following embodiments, when the transcription work is performed, the user operates a keyboard to input the text while playing back the recorded voice data, thereby converting the voice data into the text.

A: First Embodiment

Figure 1:
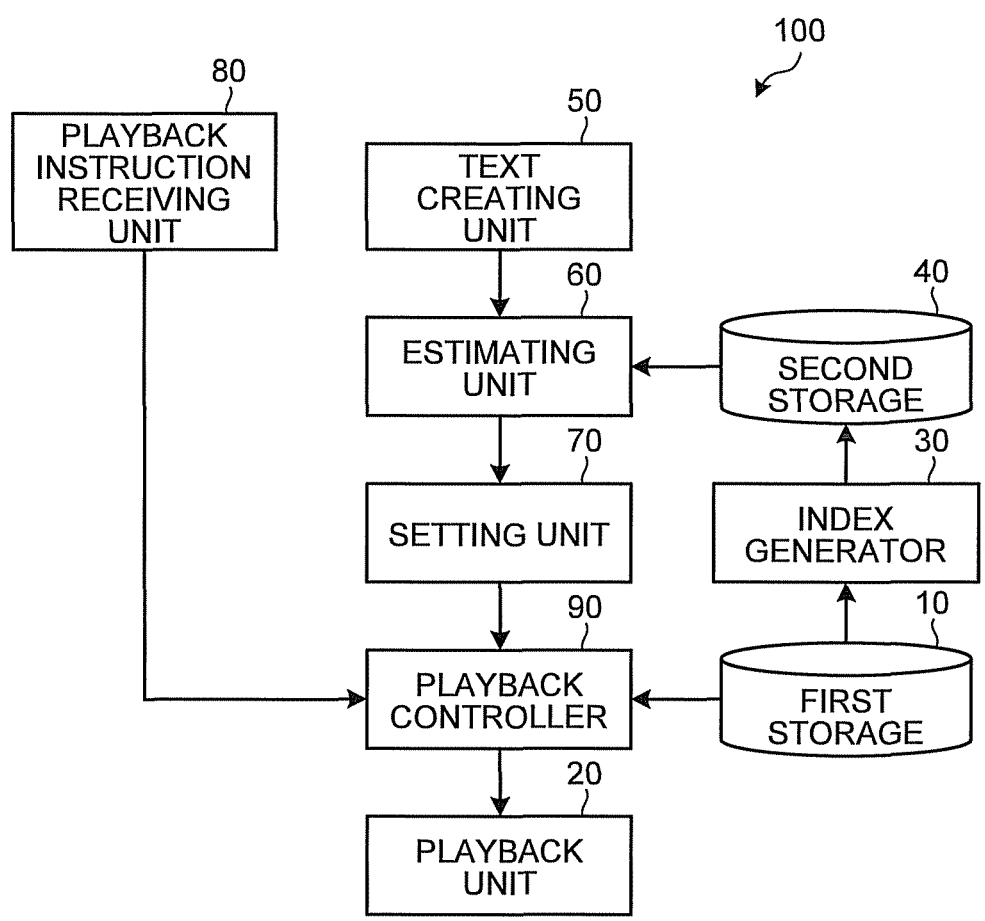
FIG. 1 is a block diagram illustrating a schematic configuration example of a transcription support system according to a first embodiment.

FIG. 1 is a block diagram illustrating a schematic configuration example of a transcription support system 100 according to a first embodiment. Referring to FIG. 1, the transcription support system 100 includes a first storage 10, a playback unit 20, an index generator 30, a second storage 40, a text creating unit 50, an estimating unit 60, a setting unit 70, a playback instruction receiving unit 80, and a playback controller 90.

The first storage 10 stores voice data. For example, the voice data is an audio file in the form of way or mp 3. Any voice data acquiring method can be adopted. For example, the voice data can be acquired through a network such as the Internet, or the voice data can be acquired with a microphone. The playback unit 20 is means for playing back the voice data. For example, the playback unit 20 is a device including a speaker, a DA converter, and a headphone.

The index generator 30 generates voice indices, each of which associates a character string obtained from a voice recognition process with voice positional information. The voice positional information is indicative of a temporal position (playback position) in the voice data and corresponds to the character string. For example, supposing the case that the voice index of the voice data "sakihodono naiyou, kyou gidaini gozaimasita kendesuga" ("Regarding the contents mentioned above, which is an issue today we are to discuss") is generated, the index generator 30 performs the well-known voice recognition processing to the voice data so as to generate the voice text data. Various well-known techniques can be adopted in the voice recognition processing. Then the index generator 30 divides the voice text data obtained through the voice recognition processing into segments smaller than a sentence. For example, the voice text data can be divided into segments such as a word, a morpheme, and a clause. However, any voice text data dividing method may be adopted. At this point, the segmentation unit used as an example is a morpheme. The index generator 30 associates each of plural morphemes constituting the voice text data with the temporal position information in the voice data. With this, the voice indices are generated as illustrated in FIG. 2. In the voice recognition process, the voice data is processed at constant intervals of about 10 to 20 milliseconds (ms). The association of the voice text data with the voice positional information can be acquired by the recognition process on the voice data.

In the example of FIG. 2, the voice positional information of a certain part of the voice data is expressed using temporal information indicative of a duration time (millisecond) necessary for the playback from the head of the part to the tail of the part. For example, voice positional information corresponding to "kyou" of FIG. 2 is "1,100 ms to 1,400 ms". This means that when the voice data is played back, a playback starting position of the voice of "kyou" is 1,100 ms and a playback ending position is 1,400 ms. In other words, the period of the voice of "kyou" starts at 1,100 ms from the head of the voice data and ends at 1,400 ms from the head of the voice data.

Referring back to FIG. 1, the description will continue. The voice indices generated by the index generator 30 are stored in the second storage 40. The voice indices can be generated in advance of the start of the transcription work, or generated in real time during the transcription work.

The text creating unit 50 creates the text in response to a user's inputting. In the first embodiment, the user can input the text by operating a device such as a keyboard, and the text creating unit 50 creates the text in response to the user's input. Hereinafter, for the sake of convenience, the text created by the text creating unit 50 is referred to as an "already-transcribed text".

Based on the voice indices, the estimating unit 60 estimates from the voice data the already-transcribed voice positional information indicative of a temporal position at which the creation of the text is completed. In the first embodiment, the estimating unit 60 specifies a character string matched with a character string constituting the already-transcribed text in plural character strings included in the voice indices, and retrieves the voice positional information corresponding to the character string matched with a last character string of the already-transcribed text. The estimating unit 60 estimates already-transcribed voice positional information from the retrieved voice positional information. Specific contents are described later.

The setting unit 70 sets a playback starting position indicative of the position at which the playback is started in the voice data based on the already-transcribed voice positional information estimated by the estimating unit 60. In the first embodiment, the setting unit 70 sets the position indicated by the already-transcribed voice positional information estimated by the estimating unit 60 to the playback starting position. The playback instruction receiving unit 80 receives a playback instruction to play back the voice data. For example, the user operates a pointing device such as a mouse to click a playback button displayed on a computer screen, which allows the user to input the playback instruction. However, any playback instruction input method can be adopted. In the first embodiment, the user can input various instructions by operating the pointing device such as the mouse to select a stop button, a rewind button, a fast-forward button, which is displayed on the computer screen. And the user can control the playback of the voice data.

When the playback instruction receiving unit 80 receives the playback instruction, the playback controller 90 controls the playback unit 20 such that the voice data is played back from the playback starting position set by the setting unit 70. The playback controller 90 can be implemented by an audio function possessed by an operation system or a driver of the PC. Alternatively, the playback controller 90 can be made by a hardware circuit such as an electronic circuit.

In the first embodiment, the first storage 10, the playback unit 20, and the second storage 40 are made by the hardware circuit. On the other hand, the each index generator 30, the text generating unit 50, the estimating unit 60, the setting unit 70, the playback instruction receiving unit 80, and the playback controller 90 is implemented such that a CPU mounted on the PC executes a control program stored in ROM. Alternatively, at least a part of the index generator 30, the text generating unit 50, the estimating unit 60, the setting unit 70, the playback instruction receiving unit 80, and the playback controller 90 can be made by the hardware circuit.

As a specific example, supposing that the user transcribes the voice data while listening to "sakihodono naiyou, kyou gidaini gozaimasita kenndesuga", and the playback of the voice data is temporarily stopped in an arbitrary position after "sakihodono naiyou,", the text of which the user transcribes. Moreover, in this example, also suppose, in advance of the start of the transcription, the voice index of FIG. 2 is generated and stored in the second storage 40.

In this case, based on the voice indices of FIG. 2, the estimating unit 60 estimates from the voice data the already-transcribed voice positional information indicative of a temporal position at which the creation of the text "sakihodono naiyou," is completed. The description is to be more specifically made. The estimating unit 60 specifies the character strings "saki", "hodo", "no", and "naiyou" matched with the character strings "saki", "hodo", "no", and "naiyou" constituting the already-transcribed text "sakihodono naiyou," in the character strings included in the voice indices. Then the estimating unit 60 retrieves the voice positional information "700 ms to 1,100 ms" corresponding to the character string "naiyou" matched with the last character string of the already-transcribed text in the specified character strings "saki", "hodo", "no", and "naiyou". Then the estimating unit 60 estimates the already-transcribed voice positional information from the retrieved voice positional information. In this example, the estimating unit 60 estimates the ending point of the already-transcribed text as "1,100 ms" using the voice positional information "700 ms to 1,100 ms" corresponding to the last character string "naiyou".

The setting unit 70 sets the already-transcribed generated voice positional information "1,100 ms" estimated by the estimating unit 60 to the playback starting position. Therefore, when the transcription work is resumed, the user operates the mouse or the keyboard to input the playback instruction, the playback of the voice data starts from the playback position of "1,100 ms".

As described above, in the transcription support system 100 of the first embodiment, the already-transcribed voice positional information indicative of a temporal position at which the transcription of the text is completed in the voice data is estimated based on the voice index; and the position of the voice data indicated by the estimated already-transcribed voice positional information is set to the playback starting position. Therefore, it is not necessary that the user adjust the playback starting position to the position in which the transcription is completed while repeating the rewind or fast-forward of the voice data. Thus, according to the first embodiment, the transcription support system can improve the work efficiency.

B: Second Embodiment

A second embodiment will be described below. In the second embodiment, a playback method is variably controlled such that a delay amount indicative of a degree of a delay of the transcription to the playback of the voice data falls within a predetermined range. Hereinafter, the same component as the first embodiment is designated by the same numeral, and the description is omitted as appropriate.

Figures 3, 4:
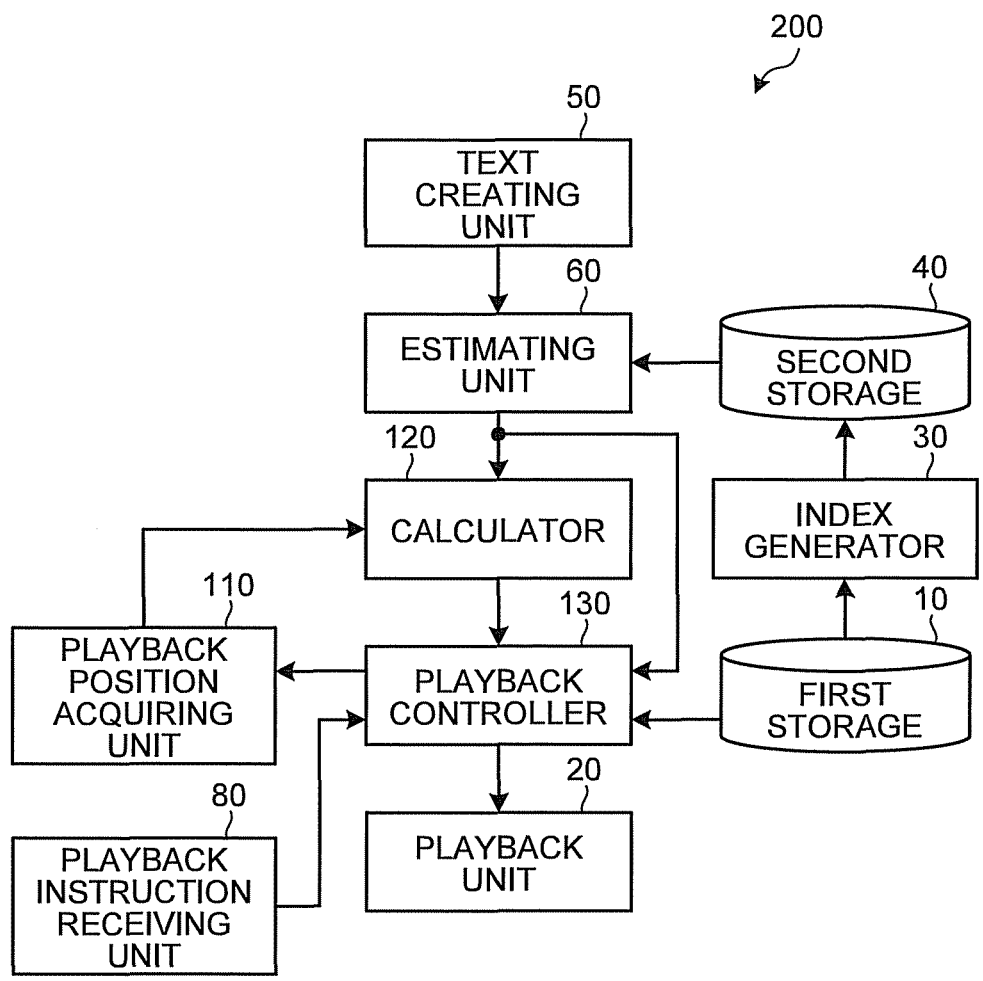
FIG. 3 is a block diagram illustrating a schematic configuration example of a transcription support system according to a second embodiment.
FIG. 4 is a view illustrating an example of three kinds of thresholds.

FIG. 3 is a block diagram illustrating a schematic configuration example of a transcription support system 200 of the second embodiment. Referring to FIG. 3, the transcription support system 200 includes the first storage 10, the playback unit 20, the index generator 30, the second storage 40, the text generating unit 50, the estimating unit 60, the playback instruction receiving unit 80, a playback position acquiring unit 110, a calculator 120, and a playback controller 130.

The playback position acquiring unit 110 acquires playback voice positional information indicative of the current playback position of the voice data played back by the playback unit 20. In the second embodiment, the playback position acquiring unit 110 acquires the playback voice positional information from the playback controller 130. Alternatively, the playback position acquiring unit 110 is not provided but the function of the playback position acquiring unit 110 may be preferably included in the function of the playback controller 130. Basically, the transcription support system 200 may include an acquisition unit that acquires the playback voice positional information.

The calculator 120 calculates the delay amount based on the already-transcribed voice positional information estimated by the estimating unit 60 and the playback voice positional information acquired by the playback position acquiring unit 110. In the second embodiment, the calculator 120 calculates a difference between the already-transcribed voice positional information estimated by the estimating unit 60 and the playback voice positional information acquired by the playback position acquiring unit 110 as the delay amount. The delay amount is calculated in arbitrary timing. For example, the delay amount may be calculated every time the text generating unit 50 generates the text (every time the text is input), or the delay amount may be calculated in each predetermined period (for example, 1 second).

The playback controller 130 performs playback control processing of variably controlling the playback of the playback unit 20 according to the delay amount calculated by the calculator 120. More specifically, the playback controller 130 compares the delay amount calculated by the calculator 120 to previously-set three kinds of thresholds sequentially A, B, and C (A>B>C), and performs the control according to the comparison result. FIG. 4 illustrates an example of the previously-set three kinds of thresholds. However, the invention is not limited to the thresholds of FIG. 4.

The playback control processing performed by the playback controller 130 will be described with reference to FIG. 5. FIG. 5 is a flowchart illustrating an example of the playback control processing. The playback controller 130 compares the delay amount calculated by the calculator 120 and the threshold A so as to determine whether the delay amount is equal to or larger than the threshold A (Step S1). When determining that the delay amount is equal or larger than the threshold A (YES in Step S1), the playback controller 130 performs a delay amount limit-time processing (Step S2). The delay amount limit-time processing means processing in the case that it is determined that the delay amount reaches a level at which the playback of the voice data cannot proceed ahead. In the delay amount limit-time processing, for example, the playback controller 130 according to the second embodiment controls the playback unit 20 such that the playback of the voice data is temporarily stopped at the current playback position. Because the playback of the voice data is automatically stopped, the user can carry on the transcription work without stopping.

As another example of the delay amount limit-time processing, after the playback controller 130 controls the playback unit 20 to issue a predetermined warning sound, the playback controller 130 controls the playback unit 20 to continue the playback while the playback position of the voice data is returned to the position indicative of the already-transcribed voice positional information estimated by the estimating unit 60. Thus, the playback is continued while the playback position of the voice data is returned to the position at which the generation of the text is completed, so that the user can continue the transcription work without temporarily stopping or rewinding the voice data while checking the word the user misses. In the example, the predetermined warning sound is issued to the user immediately before the playback position of the voice data is returned to the position in which the generation of the text is completed, so that the user can previously notice the change of the playback position of the voice data. Accordingly, the user can be prevented from looking confusingly at an abrupt change of the playback position of the voice data.

When determining that the delay amount is neither equal to nor larger than the threshold A (NO in Step S1), the playback controller 130 compares the delay amount calculated by the calculator 120 and the threshold B so as to determine whether the delay amount is equal to or larger than the threshold B (Step S3). When determining that the delay amount is equal to or larger than the threshold B (YES in Step S3), the playback controller 130 performs delay amount increase-time processing (Step S4). The delay amount increase-time processing means processing in a case that it is determined that the transcription work starts to be delayed with respect to the playback of the voice data. In the delay amount increase-time processing, for example, the playback controller 130 of the second embodiment controls the playback unit 20 such that the playback speed of the voice data is reduced compared with a normal playback speed. Therefore, because the delay amount can be decreased, the user can continue the transcription work without stopping the playback of the voice data.

As another example of the delay amount increase-time processing, the playback controller 130 controls the playback unit 20 such that the playback speed in the silent portion that does not include the voice in the voice data is reduced compared with the normal playback speed, while the playback speed in a voice portion including the voice in the voice data is maintained at a normal playback speed. Various well-known technologies can be adopted in the control method. In the case that the playback speed in the voice portion is reduced, the voice becomes difficult to hear. On the other hand, in the control method, because the playback speed in the silent portion is reduced while the playback speed in the voice portion is maintained at the normal playback speed, the delay amount can be decreased while preventing the voice from being difficult to hear.

When determining the delay amount is neither equal to nor larger than the threshold B (NO in Step S3), the playback controller 130 compares the delay amount calculated by the calculator 120 and the threshold C so as to determine whether the delay amount is equal to or larger than the threshold C (Step S5). When determining that the delay amount is equal to or larger than the threshold C (YES in Step S5), the playback controller 130 performs processing for no-delay (Step S6). The processing for no-delay means processing in a case when determined that the delay of the transcription work to the playback of the voice data does not occur. In the second embodiment, the playback controller 130 controls the playback unit 20 to continue the playback, while the playback position of the voice data is returned to the position indicated by the already-transcribed voice positional information. Therefore, the user can continue the transcription work without doing any specific operation. On the other hand, when the playback controller 130 determines that the delay amount is neither equal nor larger than the threshold C (and lower than the threshold B) (NO in Step S5), the playback control processing ends while no piece of processing is performed. Only the delay amount limit-time processing and the delay amount increase-time processing may be set while the processing for no-delay is not set. In this case, the threshold A and the threshold B are previously set.

As described above, in the second embodiment, the playback controller 130 variably controls the playback of the playback unit 20 such that the delay amount falls within the predetermined range (the range where the user can continue the transcription work), so that the user can continue the transcription work without performing the specific operation such as temporarily stopping or rewinding. That is, according to the second embodiment, the transcription support system can improve the work efficiency.

(1) First Modification

In the first embodiment, the setting unit 70 sets the voice data position indicated by the already-transcribed voice positional information estimated by the estimating unit 60 to the playback starting position. Alternatively, the setting unit 70 may set the position that is before the position indicated by the already-transcribed voice positional information by a predetermined amount to the playback starting position. Therefore, because the playback is resumed from the position that is before the position in which the transcription is completed, the user easily hears the voice data.

Similarly, in the delay amount limit-time processing and the processing for no-delay in the second embodiment, the playback controller 130 may control the playback unit 20 such that the playback is continued, while the playback position of the voice data is returned to the position that is before the position indicated by the already-transcribed voice positional information by the predetermined amount.

(2) Second Modification

In the playback control processing of the second embodiment, the playback controller 130 sequentially makes the three determinations (Step S1, Step S3, and Step S5). Alternatively, the playback controller 130 may make one or two of the three determinations.

(3) Third Modification

The unit of the delay amount is the time in the above-mentioned. However, any unit of the delay amount may be used. For example, the number of characters may be used as the unit of the delay amount.

For example, supposing the case that that the voice data "sakihodono naiyou, kyou gidaini gozaimasita kendesuga" is played back. In the case that the playback voice positional information acquired by the playback position acquiring unit 110 is "1,800 ms", referring to the voice index of FIG. 2, it is found that the current playback position of the voice data is "ni" of "sakihodono naiyou, kyougidaini". On the other hand, in the case that the already-transcribed text is "sakihodono naiyou,", it is found that the morphemes that are present between the position in which the generation of the text is completed and the voice data position indicated by the playback positional information are "kyou", "gidai", and "ni". Accordingly, the seven characters, in which the numbers of characters "kyou", "gidai", and "ni" are added, can be recognized as the delay amount. The thresholds A, B, and C can be prepared by the number of characters as the unit, and the playback control processing may be performed.

(4) Fourth Modification

In the first embodiment, the PC is used as the transcription support system. The invention is not limited to using the PC. For example, a system including a first device (such as a tape recorder) having function of playing back the voice data and a second device having function of generating the text may be used as the transcription support system. The above units (such as the first storage 10, the playback unit 20, the index generator 30, the second storage 40, the text generating unit 50, the estimating unit 60, the setting unit 70, the playback instruction receiving unit 80, and the playback controller 90) may be included in one of the first device and the second device. In the second embodiment, similarly to the first embodiment, the above units (such as the first storage 10, the playback unit 20, the index generator 30, the second storage 40, the text generating unit 50, the estimating unit 60, the playback instruction receiving unit 80, the playback position acquiring unit 110, the calculator 120, and the playback controller 130) may be included in one of the first device and the second device.

(5) Fifth Modification

In the embodiments, a language to be transcribed is Japanese. However, any language can be the target of the transcription work. For example, the target language of the transcription work can be English or Chinese. In the case of English transcription, the same configuration as that of Japanese is implemented in the first embodiment. In English, in addition to the delay amount calculation using the number of characters, it is effective that one of the number of words or the number of phonemes is employed for the delay amount for the second embodiment. The number of words in the English text can be obtained by a general technology. For example, a word dictionary used in text voice synthesis may be used in order to obtain the number of phonemes. In such cases, the threshold is also provided by the number of words or the number of phonemes as the unit. In the case of Chinese transcription, the same configuration as that of Japanese is implemented. In the delay amount of the second embodiment, the number of characters in Chinese can directly be used as the number of characters.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A transcription support system comprising:
a first memory configured to store voice data therein;
a playback circuit configured to play back the voice data;
a second memory configured to store therein voice indices, each of which associates a character string obtained from a voice-recognition process with voice positional information, the voice positional information indicative of a temporal position in the voice data and corresponding to the character string; and
a processing circuit configured to
create text in response to an operation input of a user;
estimate already-transcribed voice positional information that indicates a temporal position at which the creation of the text is completed in the voice data based on the voice indices;
acquire playback voice positional information that indicates of a current position of the voice data that is being played back by the playback circuit;
calculate a delay amount based on the already-transcribed voice positional information and the playback voice positional information; the delay amount indicating how much the generation of the text is delayed compared to the playback of the voice data; and
variably control the playback of the playback circuit so as for the delay amount to fall within a predetermined range, wherein
the processing circuit specifies a character string that matches with a character string constituting the text created by the processing circuit out of a plurality of character strings included in the voice indices, and estimates the already-transcribed voice positional information from voice positional information corresponding to a character string matched with a last character string of the text out of specified character strings, and wherein
the processing circuit, when the delay amount is equal to or larger than a second threshold, controls the playback circuit to playback a voice portion that includes the voice in the voice data at maintained normal speed, and to playback a silent portion that does not include a voice in the voice data at a lower speed than a speed in a normal playback.

2. The system according to claim 1, wherein
the processing circuit controls the playback circuit to temporarily stop the playback of the voice data at the current playback position when the delay amount is equal to or larger than a first threshold.

3. The system according to claim 1, wherein
the processing circuit, when the delay amount is equal to or larger than a first threshold, controls the playback circuit
to issue a predetermined warning sound,
to return the playback position of the voice data to a position that the already-transcribed voice positional information indicates, and
to continue the playback.

4. The system according to claim 1, wherein
the processing circuit, when the delay amount is equal to or larger than a second threshold, controls the playback circuit to playback the voice data lower than a speed of a normal playback.

5. A transcription support method comprising:
playing back voice data;
creating text in response to an operation input of a user;
estimating already-transcribed voice positional information indicative of a position at which the creation of the text is completed in the voice data based on voice indices each of which associates a character string obtained from a voice recognition process with voice positional information, the voice positional information indicative of a temporal position in the voice data and corresponding to the character string; and
acquiring playback voice positional information that indicates of a current position of the voice data that is being played back at the playing back of the voice data;
calculating a delay amount based on the already-transcribed voice positional information and the playback voice positional information; the delay amount indicating how much the generation of the text is delayed compared to the playing back of the voice data; and
variably controlling the playing back of the voice data so as for the delay amount to fall within a predetermined range, wherein
the estimating of the already transcribed voice positional information further includes,
specifying a character string that matches with a character string constituting the text created by the processing circuit out of a plurality of character strings included in the voice indices; and
estimating the already-transcribed voice positional information from voice positional information corresponding to a character string matched with a last character string of the text out of specified character strings, and wherein
when the delay amount is equal to or larger than a second threshold, the playing back of the voice data is controlled to playback a voice portion that includes the voice in the voice data at maintained normal speed, and to playback a silent portion that does not include a voice in the voice data at a lower speed than a speed in a normal playback.

* * * * *